June 28, 1966 H. L. HARENBERG, JR 3,258,699
ADAPTER CONTROL MECHANISM
Filed April 2, 1963 5 Sheets-Sheet 1

INVENTOR.
HAROLD L. HARENBERG, Jr.
BY
AGENT

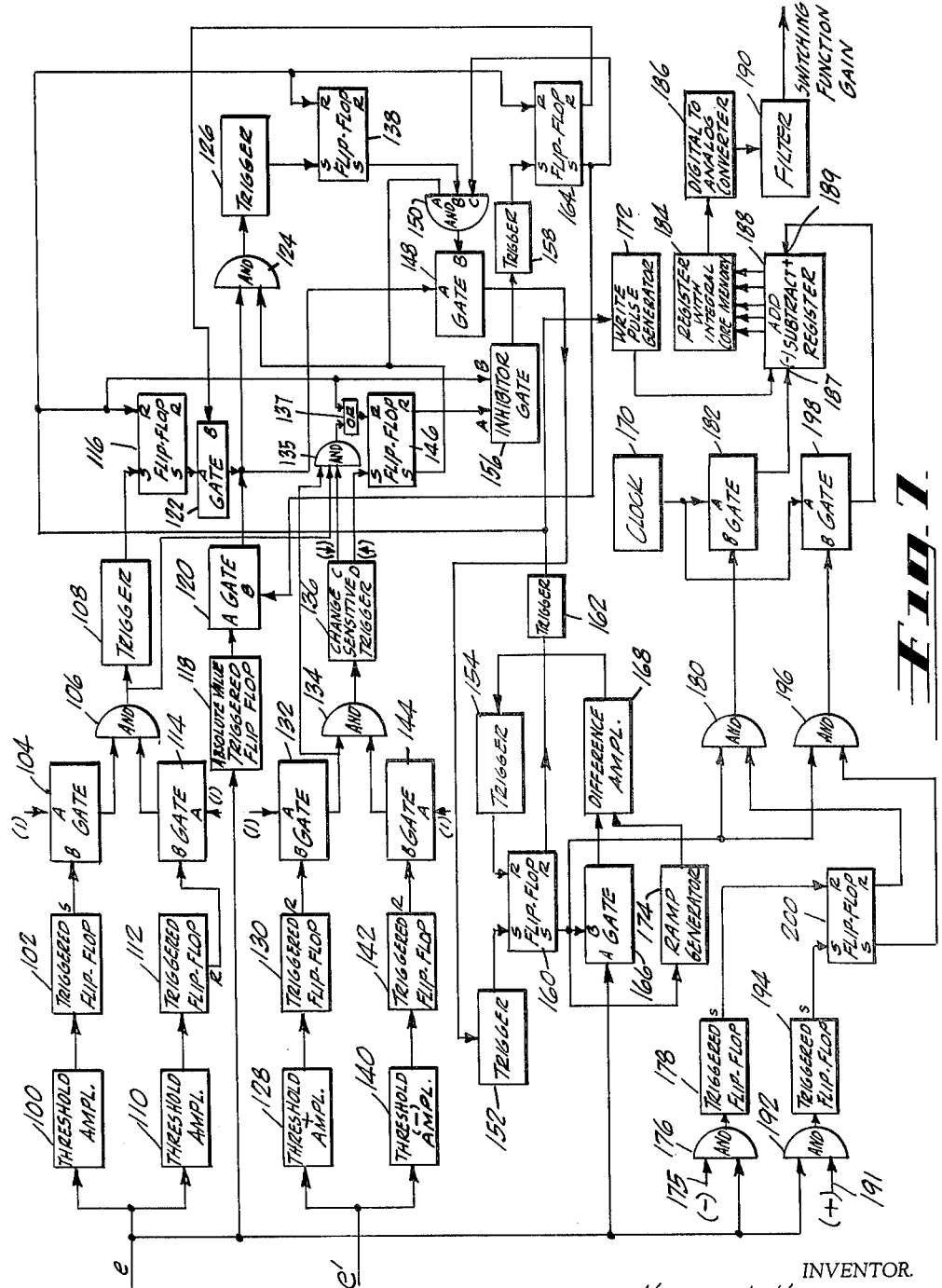

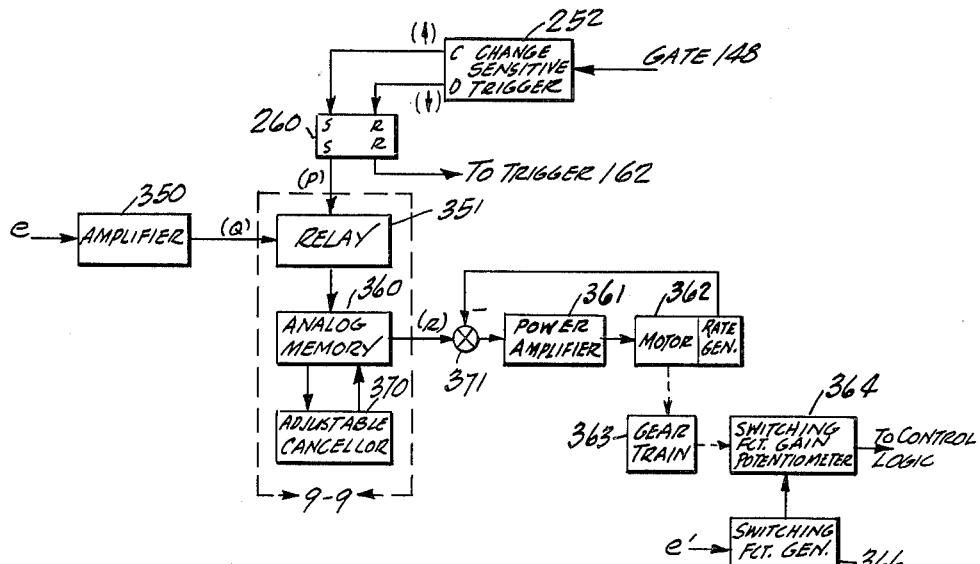
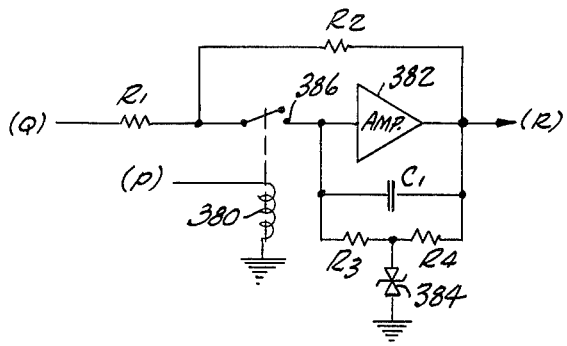

United States Patent Office 3,258,699
Patented June 28, 1966

3,258,699
ADAPTER CONTROL MECHANISM
Harold L. Harenberg, Jr., El Porto, Calif., assignor to Douglas Aircraft Company, Inc., Santa Monica, Calif.
Filed Apr. 2, 1963, Ser. No. 270,100
7 Claims. (Cl. 328—151)

This invention relates to control mechanisms which regulate the operation of systems and more particularly to means for altering the control function of such mechanisms in accordance with changes in the response characteristics of the systems they control.

Control mechanisms of the servomechanism type are used to regulate systems by sensing the actual output or operation of a system and altering the power or other input so as to conform the actual output to a desired output. It is important that the servomechanism alter the input in such a manner that the desired output is obtained rapidly and smoothly. This requires that the servomechanism apply such inputs as power in the direction needed and during precisely those periods when such applications of power to the particular system controlled will quickly cause it to yield the desired response.

If the response of the controlled system were constant, the servomechanism could be designed to efficiently cope with it. However, in numerous cases, the response of the controlled system changes significantly. For example, vertical take-off aircraft, which require servomechanism control to stabilize them during take-off, respond slower to a given corrective force when fully loaded than when empty. An ideal servomechanism would alter its control characteristics when the response of the controlled system changed and therefore might, in the preceeding example, apply corrective forces for a longer period when the response of the aircraft indicated it was fully loaded. A self-adaptive control device which would alter a servomechanism in accordance with changes in the response characteristics of a controlled system, as sensed by monitoring some significant parameter of system response, so as to provide efficient servomechanism control at all times would be highly desirable. Of course, such need applies to various types of control systems which may regulate manufacturing processes, automatic machine tools, aircraft and missiles, etc.

The present invention provides an adapter control device which alters a servomechanism in accordance with changes in the response characteristics of the system controlled, to always provide efficient control. The adapter control device of the invention generally alters the servomechanism by altering its switching curve (or curves, in the case of high order systems). The switching curve is a function relating one deviation from the desired output, generally termed the error $e$, to another variable of the system, and especially to the derivatives of the error $e$ denoted by the symbols $e'$ (the rate at which the error is increasing or decreasing), $e''$, $e'''$, etc., or relating various derivatives $e'$, $e''$, $e'''$, etc. to each other. When certain relationships exist between such terms as $e$ and $e'$, for example, a servomechanism may turn on a stabilization rocket on one side of an aircraft; when certain other relationships between $e$ and $e'$ exist, the first rocket is turned off and a rocket on the other side of the plane is turned on. A switching curve of the servomechanism should take into account the time for the rocket to respond to a turn-on command, the weight and moment of inertia of the craft, the damping as by airfoils after some forward speed is reached which will reduce the correction achieved by a given impulse of the correcting rocket, and other factors affecting the response characteristics of the aircraft.

For some applications of servomechanisms and control systems, the need to provide self adaption to changing response characteristics of the controlled system is very great. Sometimes self adaption is especially useful for "bang-bang" or relay control systems wherein the power input or corrective forcing function is of only one magnitude (though of either of two polarities). When such systems approach zero deviations from the desired output, the correcting force is still strong and the system is likely to over or under correct if the controlled system has response characteristics different from those expected. Since corrective forces are large even near zero deviation, it is important that they be employed very accurately. Although they sometimes possess disadvantages, relay control systems are often used because of the great simplicity, low cost, and reliability of the on-off devices they employ. For simplicity, the invention will be discussed primarily in terms of adapters for such relay control systems.

Accordingly, one object of the invention is to provide an adapter device for control mechanisms which will enable them to display characteristics appropriate to the response of the systems they control.

Another object of the invention is to provide an adapter device for servomechanisms which will enable the alteration of the switching curves of the servomechanism so as to provide efficient control in spite of changes in the response characteristics of the controlled system.

A further object of the invention is to provide an adapter control device for adapting the control characteristics of a control mechanism, which will generally be unaffected by noise or small random changes in the response of the controlled system.

A further object of the present invention is to provide an adapter control device for adapting the control characteristics of a control mechanism, which appropriately alters the control mechanism automatically and during the first correction of an upset occurring after a change in the response characteristics of a system.

A further object of the present invention is to provide an adapter control device which will alter a control mechanism whenever it is used, thereby to adjust it closer and closer to the desired characteristics.

These and other objects and a fuller understanding of the invention may be had by reference to the accompanying description and claims, taken in conjunction with the accompanying drawings in which:

FIG. 7 is a more detailed block diagram representation of the embodiment of the adapter control mechanism of FIG. 5.

FIG. 8 is a block diagram representation of an alternative embodiment, using analog devices, of the correction circuit of FIG. 7.

FIG. 9 is a circuit diagram of the circuit portion 9—9 of FIG. 8.

Figure 1:
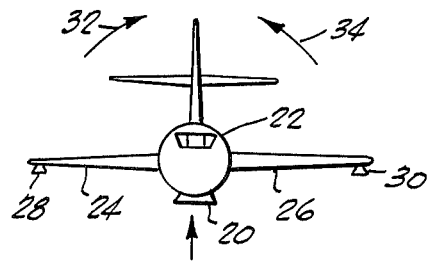
FIGURE 1 is a representation of a vertical take-off aircraft with stabilizing rockets mounted on opposite wing tips.

It is helpful in attempting to understand the factors involved in correcting the control characteristics of a servomechanism, to first understand the operation of a servomechanism in controlling a system. One example of a controlled system is a vertical take-off aircraft as represented in FIG. 1, wherein the major portion of lifting thrust is supplied by a main rocket 20 located at the center of gravity of the fuselage 22. During the initial stages of take-off, the forward airspeed of the craft is zero or very small and the wings 24 and 26 do not provide stability Rockets 28 and 30 at opposite ends of each wing are used to provide roll stabilization. When stabilizing rocket 28 is activated, it produces a torque which tends to roll the craft in one direction 32. Activation of the other stabilizing rocket 30 tends to roll the craft in the opposite direction 34.

When it is desired to provide roll rate stabilization to hold the craft in any desired positon, deviations from zero roll rate may be denoted as roll rate error $e$, and the roll acceleration (or change of rate error $e$) may be denated as roll acceleration error $e'$. For any given roll rate error $e$ and roll acceleration error $e'$, the movements of the plane can be predicted in the absence of any applied thrust or in the presence of a known thrust. Thus, one can predict the changes of $e$ and $e'$ upon the application of a corrective thrust as by stabilizing rocket 28 or 30. (The relationships of other derivatives $e'$, $e''$, $e'''$, etc. may also have to be considered to adequately determine the craft response.)

Figure 2:
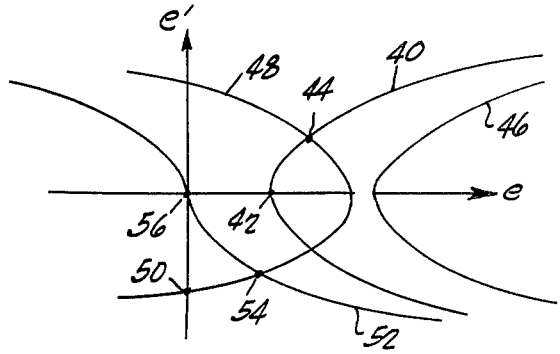
FIG. 2 is a phase trajectory plot, or plot of the error rate $e'$ vs. error $e$ characteristics of a typical unstable system, with a steady state forcing function applied.

The characteristics of a typical system are represented by the phase trajectory of FIG. 2 wherein the relationships of roll rate error $e$ and roll acceleration error $e'$ are shown. The curve 40 represents one set of characteristics of an unstable system such as the vertical take-off craft of FIG. 1 with a right wing upward stabilizing force applied, as by rocket 30. If at some instant the aircraft possessed a roll rate error $e$ and roll acceleration error $e'$ which lay on the curve 40 then (for constant applied torque), as $e$ changed the roll acceleration error $e'$ would change in such a manner that the relationship would be as given by curve 40. The relationship between $e$ and $e'$ of the aircraft will follow and lie on the curve 40 or on another similar curve such as curve 46. There is a whole family of curves similar to curves 40 and 46 that may be followed.

In order to reduce the roll rate error $e$ and roll acceleration error $e'$ of the aircraft, the applied torque must be reversed as by switching stabilizing off rocket 30 and turning on rocket 28 to produce a corrective torque. Upon the application of a sufficient corrective torque $e$ and $e'$ of the aircraft will change so as to reduce roll rate error $e$ to zero.

For a given corrective force of constant amplitude, such as that provided by a bang-bang or relay servo controlled rocket system with which the present discussion is concerned, the relationship of $e$ and $e'$ upon the firing of the rocket 28 is given by a curve such as 48, which is similar to the curves 40 and 46, but which opens in the opposite direction. The bang-bang servomechanism is operated with one or the other rocket 28 or 30 always on, except when $e$ is almost zero. If a corrective thrust is applied at point 44, as by rocket 28, the craft will follow an $e$ vs. $e'$ trajectory as given by curve 48.

If the corrective force is applied for a sufficiently long period, the craft will reach a position of zero roll rate with acceleration $e'$ as given by point 50, and will thereafter attain a negative roll rate error $e$ which will continually increase.

In stabilizing an aircraft, it is desirable to reduce the roll rate error $e$ and roll acceleration error $e'$ to zero at the same time so that, once attained, the craft will remain at zero roll rate error. This may be accomplished with a bang-bang servo controlled system by applying first a corrective thrust which will rotate the craft so as to tend to reduce the rate $e$ and then, before zero rate is attained, applying a reverse thrust which will reduce the roll acceleration $e'$ as zero rate is attained. This process may be accomplished, as represented on the curves of FIG. 2, by applying a thrust when the aircraft is at point 44, continuing the constant stabilizing thrust while the craft follows the curve 48 until point 54 is reached, reversing the stabilizing thrust at point 54, and maintaining this thrust while the curve 52 is traversed until the origin, point 56, is reached and a stable limit cycle around the origin is established, wherein both stablizing rockets 28 and 30 are off until a significant deviation from the origin occurs. In this way, a zero roll rate error $e$ and zero acceleration error $e'$ are obtained simultaneously, and the craft will remain in the region of zero roll rate (the angle of roll will remain constant). (In most cases desired roll rate is zero, so roll rate and roll rate error are usually the same.)

The curve 52 is generally denoted the optimum switching curve. For any trajectory resulting from the application of a corrective torque such as curve 48, the craft can be brought to a state of zero roll rate error $e$ and zero roll acceleration error $e'$ by means of thrust reversal at the instant when the corrective trajectory, the path between points 44 and 54, intersects and lies on the optimum switching curve 52. There is only one optimum switching curve (for each pair of derivatives of the roll $e$), and it is a function of the response characteristics of the aircraft.

In practice a bang-bang servomechanism includes sensors which sense the system outputs form which an error function and its time derivatives can be calculated, and compares them with the function, as illustrated herein for a second order system, given by the switching curve 52. For any positive roll rate error $e$, a corrective torque is maintained when $e'$ is greater (in algebraic value) than the roll acceleration error $e'$ of points on the swithcing curve 52. When $e'$ of the craft is less (algebraically) than $e'$ of points on the switching curve 52, then a reverse thrust is maintained to decrease the rate at which the craft approaches zero error $e$. It may be said that when the craft is "above" the part of the switching curve to the right of the $e'$ axis (or "below" the left half), corrective thrust is applied; when the craft is "below" the right half of the switching curve (or "above" the left half), reverse thrust is applied.

Figure 3:
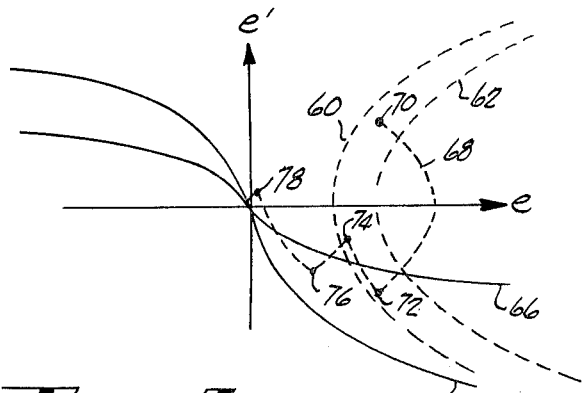
FIG. 3 is a phase trajectory plot of an unstable system, showing the trajectory taken when bang-bang or relay servo control is applied to correct a deviation, the switching function of the servo control being inappropriate to the system it controls.

As mentioned hereinabove, there is only one switching curve (for any two variables) optimum for the characteristics of the particular system controlled. If the moment of inertia, damping or corrective torque obtainable changes, the proper switching curve for that state of the aircraft will be different. In FIG. 3 is shown the switching curves for a fully loaded and for an empty vertical take-off aircraft. If the craft is empty, it will display response characteristics such as those shown by curves 60 and 62. The optimum switching curve for the empty craft, curve 64, is very much like one of the curves 60 or 62, except that it crosses the origin. The optimum switching curve for the fully loaded craft, curve 66, is much flatter than that for the loaded condition.

If a switching curve is used which is not appropriate to the response characteristics of the controlled system, the craft will not be brought to the origin smoothly, nor with a minimum expenditure of energy. Such a situation is represented by the trajectory plot 68 of FIG. 3 for an unloaded aircraft in which a switching curve for the loaded condition is initially employed. The servomechanism is actuated at point 70 and it reverses the stabilizing thrust which causes the unloaded craft to follow the curve 68 until curve 68 intersects switching curve 66. The switching curve 66 is appropriate only to a fully loaded aircraft. At point 72, which occurs soon after the curve 66 is passed, a thrust reversal is initiated and the plane follows the response curve 60 of the unloaded plane to point 74, which is above switching curve 66. Then the corrective thrust is re-initiated and the plane follows the trajectory to point 76, where a reverse thrust is again applied until point 78 is reached. There, another thrust reversal occurs for a short period, after which the craft dynamics enter a stable limit cycle by periodically reversing thrust in the region of the origin.

The disadvantages arising from the use of a switching curve inappropriate to the response characteristics of the system are many. The direction of thrust must be reversed many times, instead of just once as with a proper switching curve, or alternatively, a large number of overshoots of $e=0$, $e'=0$ will occur. To keep the number of thrust reversals to a minimum, they may be made to occur only when the $e$ vs. $e'$ characteristics stray considerably from the switching curve used as illustrated in FIG. 3. As a result, the plane would not be rapidly brought close to zero $e$ and zero $e'$.

By means of the present invention, the switching curve is automatically altered so that an appropriate curve is used for any response characteristic of the aircraft. This also permits switching or thrust reversal to be applied before the trajectory strays far from the switching curve.

Figure 4:
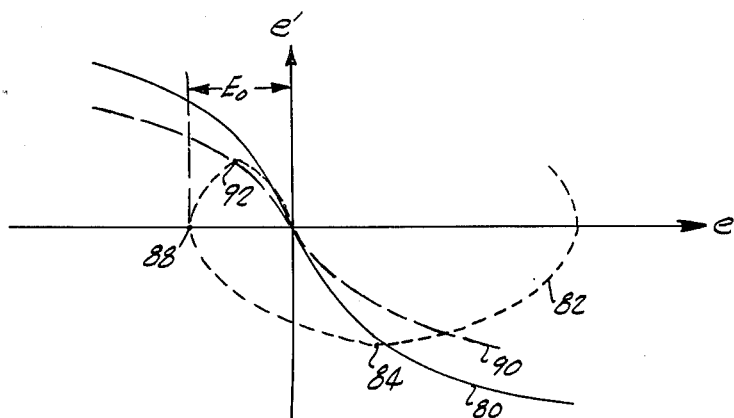
FIG. 4 is a phase trajectory plot of an unstable system showing the trajectory taken for an incorrect switching curve, and the factors involving in the correction of the curve.

The way in which the switching curve is altered is illustrated in FIG. 4, in a simplified representation. At first, a switching curve 80 is used which was found appropriate during the last use of the aircraft when, it is assumed, it was empty. The aircraft is now assumed to be fully loaded and the optimum switching curve is curve 90. The $e'$ vs. $e$ trajectory 82 of the aircraft will approach the old switching curve 80. When the trajectory lies below the switching curve 80 as at point 84, a reverse thrust is applied. Excursions above and below the initial switching curve are partly due to the lag between the transmitting of signals to start rockets and their actual firing and reaching of full thrust. The excursions are less as $e'$ approaches zero, since the craft then moves less during the time lag.

The phase trajectory 82 of the fully loaded craft follows a path which takes it far below the switching curve 80 because the craft is fully loaded and reverse thrust was applied too late.

When the trajectory crosses the $e$ axis (i.e., when $e'$ is zero) as at point 88, the corresponding error $E_0$ is noted and the switching curve is altered. If the first crossing of the $e$ axis occurs at a negative $E_0$ as at point 88, then the switching curve must be brought closer to the horizontal axis. If $E_0$ is positive, the switching curve is widened to move it further from the horizontal axis, the $e$ axis. A small $E_0$ signifies that the switching curve used is almost the proper one and must be changed only slightly, while a large $E_0$ indicates the need for a large change in the switching curve.

After the switching curve is corrected, a thrust reversal will next be commanded when the trajectory crosses the new corrected switching curve as at point 92. If the correction was proper, the trajectory will smoothly reach within a small band (sometimes termed the "limit cycle") of the origin with no additional thrust reversals. If the correction was not sufficient, further corrections will be generated when the trajectory again crosses the $e$ axis at a point other than the origin following a suitable disturbance. When another disturbance occurs, the corrected switching curve is used and the system returns to null smoothly, often with only one torque reversal.

Figure 5:
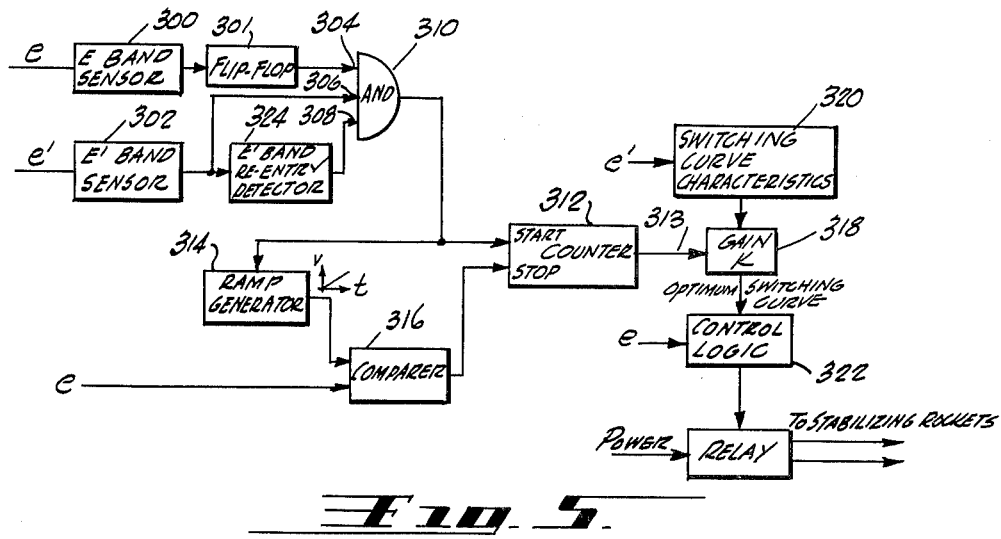
FIG. 5 is a simplified block diagram representation of one embodiment of an adapter control device.
Figure 6:
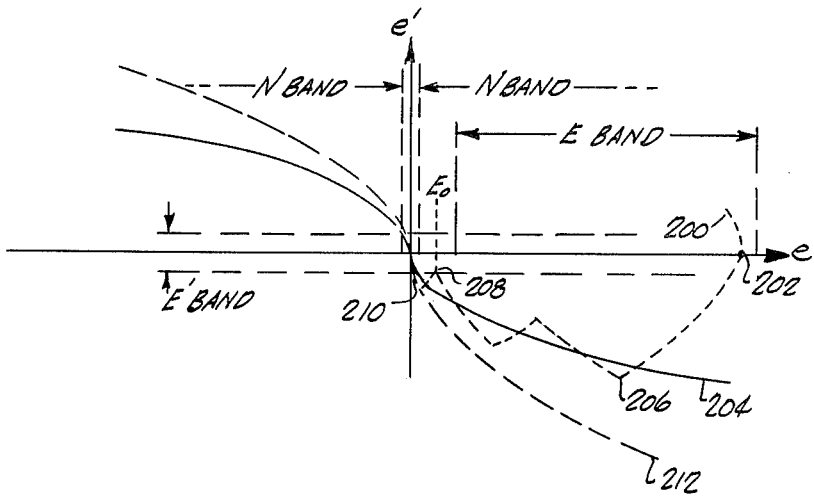
FIG. 6 is an illustration of the trajectory followed by a system controlled by a servomechanism which incorporates the adapter control device of FIG. 5, and showing the factors involved.

The adaption of the servomechanism is accomplished by the adaptive circuit shown in summary in FIG. 5, and its operation as related to the $e'$ vs. $e$ trajectories are shown in FIG. 6.

As shown in FIG. 6, there is a band of roll rate error values denoted the E band and a band of roll acceleration error values denoted the E' band, in which the adaptive control device operates.

Assuming an aircraft is being stabilized and that it follows path 200 past the point 202 which lies on the $e$ axis and continues along the trajectory 200 until it passes switching curve 204. When point 206 is reached, a thrust reversal is completed and this process continues until point 208 is reached.

When the aircraft response trajectory enters the E' band at 208, the adaptive control mechanism seeks to correct the switching curve. However, it is necessary that such correction take place when the aircraft is following a switching curve trajectory such as 204. Therefore, the first time that the aircraft trajectory passes through the E' band as at point 202, no correction occurs; instead, when the trajectory first leaves the E' band at a point also within the E band, the adaptive control mechanism is placed in a state wherein it will apply corrections which are a function of $E_0$ (or other output variables in the case of higher order systems) when the trajectory re-enters the E' band as at 208.

The correction to the switching curve 204 which is applied depends upon the $e$ coordinate, $E_0$, at which the trajectory re-enters the E' band. If $E_0$ is positive and very large, the switching curve 204 will be moved much farther from the $e$ axis, as by moving from the position of curve 204 to the position of curve 212, while if $E_0$ is very small, the switching curve will be moved a small amount. (Negative $E_0$'s cause a corresponding movement of the switching curve toward the $e$ axis.)

Thus, when the trajectory reaches point 208 and a thrust reversal is applied, the trajectory moves to point 210 wherein it crosses the corrected switching curve 212. A thrust reversal is now applied which will bring the aircraft to a position of 0 roll rate error $e$ and 0 roll acceleration error $e'$.

As shown in FIG. 6, the E band has an upper and lower limit. The reason why a lower limit of $e$ is provided is to prevent small recurring random upsets or "noise" from initiating corrections. Noise causes a small random trajectory rather than a trajectory characteristic of the response of the aircraft, and any corrections based on a random trajectory might be in error. It should be noted that the possibility for such faulty corrections to occur is largely eliminated by the filtering action of the E' band, which prevents system adaptions to most noise-type disturbances.

The reason why an upper limit of the E band is provided is to prevent very large excursions from initiating a correction. The response of the aircraft to very large upsets is not representative of normal operation. False corrections to the switching curve could thus result if there were no E band upper limit. It is possible to eliminate the upper limit and expand the E band to infinity, and the adaption process would be properly made in most cases.

It is often desirable to prevent the initiation of corrections if the trajectory followed is so close to optimum that it re-enters the E' band at a value of $e$ very close to zero. This is to prevent unnecessary use of the circuit. Accordingly, a null band N extending from a small negative $e$ to minus infinity and from a small positive $e$ to plus infinity may be established to prevent the occurrence of corrections when re-entry into the E' band is very close to the switching curve (which passes into the E' band at a value of $e$ very close to zero).

One embodiment of an adapter control mechanism which accomplishes the foregoing corrections is shown in summary form in the block diagram of FIG. 5. In the adapter mechanism, roll rate error $e$ is applied to an E band sensor 300 which yields an output to turn on flip-flop 301 when $e$ is within the E band. The roll acceleration error $e'$ is applied to an E' band sensor 302 which yields an output when $e'$ is within the E' band. When the trajectory is within the E' band and has previously passed within the E band, signals will appear on the inputs 304 and 306 to an "and" gate 310, which may yield an output. The output from the "and" gate 310 starts a time counter 312 and a ramp generator 314. The output of the ramp generator 314 enters a comparer 316 which compares the ramp voltage from 314 with the error $e$. When the ramp voltage exceeds $e$, the comparer 316 produces a pulse which stops the counter 312. The time period counted by the counter 312 produces a change in the variable gain circuit 318.

The switching curve is obtained by a generator 320 which produces a function which is characteristic of all $e'$ vs. $e$ switching curves of interest. By multiplying this function by the gain K of the gain circuit 318, any desired switching curve of the same basic type is obtained.

A logic circuit 322 compares the roll rate error $e$ of the aircraft phase trajectory with the function of $e'$ given by the generator 320 (and amplified) and activates one stabilizing rocket when the trajectory is above the initial switching curve, and activates the other stabilizing rocket when the trajectory is below the switching curve.

As described hereinabove, it is important that corrections occur only after the aircraft response has begun to follow a trajectory selected by the switching curve, and corrections must occur only after the phase trajectory passes once through the E' band as it seeks to approach null. The circuit of FIG. 5 provides for the foregoing by requiring that an input occur on input 308 of the "and" gate 310 before any pulse is produced to start the time counter 312 or ramp generator 314. A pulse to input 308 is provided only during the second passage of the trajectory through the E' band (following a passage through the E' band while in the E band), by means of block 324.

FIG. 7 shows a detailed block diagram of the adapter control mechanism which is illustrated in summary in FIG. 5. The circuit of FIG. 7 uses set-reset flip-flops such as block 116, each of which has two inputs and two outputs: a set output S which yields a unity signal after the set input S receives a pulse, and a reset output R which yields a unity signal after the reset input R receives a pulse. (Only one output, R or S, is on at one time.) The circuits labeled triggered flip-flop such as block 102 produce an output on their S lines only while an input is received; when no input is received an output appears only on the R output. The variable threshold amplifiers 100 and 110 yield a signal output only when a certain positive value of $e$ is exceeded. The amplifier 128 yields a signal when the input exceeds a threshold positive value while amplifier 140 yields a signal when its input exceeds (in negative magnitude) a threshold negative value. The change sensitive trigger 136 is sensitive to the direction of change of the input; if the input signal to 136 is falling, a pulse will appear an output port C while if the input is rising, a pulse will appear on output port D. Such a trigger 136 may easily be obtained by providing a capacitor-resistor differentiating circuit connected to two diodes, one diode connected to port C and one to port D, which are oriented to conduct currents in opposite directions. The inhibitor gate 156 is a gate wherein all inputs to the A port pass except at such times as a signal is received on the B port; this is different from a normal gate wherein inputs to A port pass only when there is a signal on the B port. The absolute value triggered flip-flop 118, which yields a signal when a predetermined absolute value of input is exceeded, may be obtained by providing full wave rectifier and threshold amplifier in front of a standard triggered flip-flop. The add-subtract register 188 can be obtained by using the register shown on page 123 of Arithmetic Operations in Digital Computers by R. K. Richards, published by Van Nostrand Co., Inc. in 1955.

The operation of the circuit of FIG. 7 begins with the placing of the adapter mechanism in a state wherein it is ready to go through a correcting cycle, which is accomplished at the end of the previous adaption cycle. This is performed in the following manner: at the conclusion of an adapting cycle, trigger 154 is actuated to reset flip-flop 160. Flip-flop 160 thereupon actuates trigger 162 to reset flip-flops 116, 138, 146 and 164, and to excite write pulse generator 172. The mechanism is now ready to act upon any appropriate excursions of the phase trajectory.

Assuming that error $e$ is above the threshold of threshold amplifier 100, amplifier 100 will produce a signal which sets flip-flop 102, which in turn allows gate 104 to conduct a unity signal denoted as (1). Assuming also that error $e$ is below the threshold of threshold amplifier 110, no signal will be supplied to flip-flop 112, and flip-flop 112 will remain in a reset position wherein a signal is transmitted to gate 114 to allow it to conduct a unity signal.

The passage of unity signals through gates 104 and 114 to "and" gate 106 causes the "and" gate to actuate trigger 108 and set flip-flop 116.

The unity output of flip-flop 116 leads to gate 122. Gate 122 conducts this unity output inasmuch as it is opened by the reset output signal of flip-flop 164 (flip-flop 164 was reset by trigger 162 at the conclusion of the previous adapting cycle as explained hereinabove). The unity output of gate 122 is applied to the "and" gate 124. Also leading to the "and" gate 124 is a second line from the set output of flip-flop 146 which is controlled by the error rate $e'$ as will be explained hereinafter.

If $e'$ is below the threshold of positive threshold amplifier 128, the flip-flop 130 will remain on reset. The reset output of flip-flop 130 allows gate 132 to conduct a unity signal to the "and" gate 134. If $e'$ is also above the negative threshold of negative threshold amplifier 140, then no signal will be applied to trigger flip-flop 142 and it will remain on reset. The reset output of flip-flop 142 turns on gate 144 and allows for the conduction of a unity signal to "and" gate 134. Thus, if $e'$ is between the positive threshold of 128 and the negative threshold of 140, which together form an E' band, "and" gate 134 will conduct.

When "and" gate 134 first starts conducting, a rising pulse is transmitted to trigger 136, and the D output of trigger 136 produces a signal which sets flip-flop 146. The set output of flip-flop 146 enters the A input port of gate 150 and also the "and" gate 124. Inasmuch as the "and" gate 124 receives a signal from gate 122, the "and" gate 124 is turned on and produces a signal which turns on trigger 126, and 126 in turn sets flip-flop 138. The unity output signal of flip-flop 138 is then applied to the B input of "and" gate 150.

Although "and" gate 150 receives an input on its A and B input ports, it is nevertheless in a non-conducting state because no input enters the C port. No signal enters the C port of "and" gate 150 because flip-flop 164 is on reset as explained previously. "And" gate 150 controls the correction cycle of the adapter mechanism, and since it is non-conducting during the first excursion through the E and E' bands, no correction is made during the first excursion of the phase trajectory through the E' band.

When E' passes out of the E' band, variable threshold amplifier 128 or 140 is actuated, no output appears on the R output of flip-flop 130 or 142, gate 132 or 144 is closed, and gate 134 transmits no signal to trigger 136.

The drop of input signal to change sensitive trigger 136 produces an output on the C port of trigger 136 instead of the D port. This output activates the "or" gate 137 (assuming that "and" gate 135 is on, as will be discussed hereinbelow), which in turn produces a signal which resets flip-flop 146. The reset output of flip-flop 146 enters inhibitor gate 156. At that instant, there is no pulse from trigger 162 to the B input of inhibitor gate 156 to turn it off; therefore, the R output of flip-flop 146 passes through inhibitor gate 156 to activate trigger 158 which sets flip-flop 164. The set signal from flip-flop 164 is supplied to the C port of "and" gate 150. Thus, when $e'$ passes out of the E' band, there is a signal into the C input of gate 150. However, there is no input to the A port of gate 150 inasmuch as flip-flop 146 has been reset.

The set output of flip-flop 164 is also supplied to gate 120 to turn it on. As long as error $e$ is within the N band as illustrated in FIG. 6, flip-flop 118 will supply a signal to gate 120. Inasmuch as gate 120 is turned on, the signal from flip-flop 118 will pass therethrough and enter gate 148. However, gate 148 will be turned off to prevent passage of signals until there is a signal on all three inputs of "and" gate 150. A signal to the A input of 150 will not occur until $e'$ again comes within the E' band, to set flip-flop 146.

When $e'$ comes again within the E' band, amplifiers 128 and 140 will be off and signals will emanate from flip-flops 130 and 142 to turn on gates 132 and 144. Therefore, "and" gate 134 will be turned on and the rising input to trigger 136 will activate the D output of 136 to set flip-flop 146, which will supply a signal to the A input of "and" gate 150. As a result, "and" gate 150 will turn on and open gate 148.

As long as $e$ is within the N band (i.e., the absolute value of $e$ is more than a certain small amount), flip-flop 118 will provide a signal that can pass through gate 120 and supply a signal to gate 148. Gate 148 will supply a signal to trigger 152 which sets flip-flop 160. Thus, upon the second excursion into the E' band, flip-flop 160 is set.

The unity set signal from flip-flop 160 simultaneously allows gate 166 to conduct the analog signal $e$ to the difference amplifier 168, starts the ramp generator 174, and supplies unity signals to "and" gates 180 and 196.

The sign or polarity of the $e$ signal is discriminated by "and" gates 176 and 192 into which are delivered small negative and positive signals over lines 175 and 191, respectively. If $e$ is positive, "and" gate 192 triggers flip-flop 194 which sets flip-flop 200, turns on "and" gate 196, and turns on gate 198, which allows clock pulses from clock 170 to pass to the count up or add side 189 of the add-subtract register or counter 188. If the $e$ signal is negative, it turns on "and" gate 176 and triggers flip-flop 178 to reset flip-flop 200. In that case, "and" gate 180 is turned on to open gate 182 and allow clock 170 to supply signals to the count down or subtract side 187 of register 188. Thus, if $e$ is positive, the register 188 counts up, and if $e$ is negative, register 188 counts down.

The ramp generator 174 is turned on at the same time that the register begins counting. The output of the ramp generator 174 is entered into the difference amplifier 168. When the ramp generator output exceeds the absolute value of $e$ as passed by gate 166, the difference amplifier 168 generates an output which excites trigger 154 to reset flip-flop 160. The absence of a set signal from 160 immediately turns off gate 180 or 196 (whichever was on) and stops conduction of gate 182 or 198. The turning off of gate 182 or 198 (whichever was on) holds the register 188 at the reading existing as of the time of resetting flip-flop 160.

The reset output of flip-flop 160 also actuates trigger 162 to reset flip-flops 116, 138, 146 and 164 as mentioned hereinabove. Also, trigger 162 actuates write pulse generator 172.

The write pulse into generator 172 causes it to provide a non-destructive read-out of register 188 into register 184. The register 184 operates a digital to analog converter 186. The analog output of converter 186, which is proportional to the time count of 188, passes through a filter 190 to control the gain of the initial switching function. Thus, if $E_0$ is large so that the ramp voltage must continue for a long time before the add-subtract register 188 is turned off, a large output will result from converter 186. The output of filter 190 controls the value of the initial switching curve in a manner shown in FIG. 5, in which the input 313 to amplifier 318 controls the gain K of the output of the switching curve characteristics generator 320.

For most large upsets of the system, the phase trajectory will rise above the E' band at a positive value of $e$ which is below the lower limit of the E band. Thus, this excursion out of the E' band will not place the circuit of FIG. 7 in a ready state (which is herein defined as that state wherein a correction may be initiated upon the next excursion within the E' band). However, on rare occasions, an upset may occur which will take the trajectory out of the E' band (and above it) at a value of $e$ within the E band. To prevent such an occurrence from placing the circuit in a ready state as defined herein, an "and" gate 135 is placed between trigger 136 and "or" gate 137. Leading into the "and" gate is the output of gate 132. Thus, only when the trajectory is below the positive or upper limit of the E' band wherein gate 132 yields a signal, is the additional "and" gate turned on to reset flip-flop 146 and place the circuit in a ready state as defined herein (assuming also that there is a third input to the "and" gate 135 from block 106).

There are also rare occasions wherein an upset occurs which takes the trajectory out of (above) and back into the E' band at points below the lower limit of the E band. Such a disturbance is noise and corrections should not be made therefor. Accordingly, the output of "and" gate 106 is connected to a third input of "and" gate 135. Only when the trajectory lies within the E band will gate 135 be open to allow the circuit to acquire a ready state wherein corrections may be initiated.

The portion of the adapter circuit of FIG. 7 which samples $e$ and alters the switching curve after a sampling pulse from gate 148 is received is shown in FIG. 7 in an embodiment using digital computation. This portion of the circuit is hereinafter denoted the correction circuit and it includes blocks and portions 152, 154, 160, 166, 168, 170, 172, 174, 175, 176, 178, 180, 182, 184, 186, 187, 188, 189, 190, 191, 192, 194, 196, 198, and 200. The correction circuit of FIG. 7 may be replaced by the analog circuit of FIG. 8 which is simpler and more economical although it requires considerably greater space and weight than the correction portion of FIG. 7. (FIG. 8 also shows the switching function gain control 314 not shown in FIG. 7).

The correction circuit of FIG. 8 replaces the corresponding correction circuit of FIG. 7 by connecting the change sensitive trigger 252 of FIG. 8 to the gate 148 of FIG. 7 (in place of trigger 152) and the R output of flip-flop 260 of FIG. 8 to the trigger 162 of FIG. 7 (in place of the R output of flip-flop 160).

In FIG 8 $e$ is continuously amplified by amplifier 350 and the amplified $e$ is delivered to relay 351. Upon the excursion of the phase trajectory of $e'$ vs. $e$ within the E' band, gate 148 produces a unity signal which is applied to the change sensitive trigger 252. The change sensitive trigger 252 is similar to the trigger 136 described hereinbefore. The rising input to change sensitive trigger 252 produces a pulse on its output port C which sets flip-flop 260. The set output of 260 closes the contacts of relay 351 and causes the application of the amplified analog value of $e$ to analog memory 360.

During the termination of the unity signal from gate 148, the falling signal produces an output at D of 252 which resets flip-flop 260, thereby opening the contacts of relay 351. The adjustable canceller 370 thereupon reduces to zero as a (approximately linear) function of time the amplified value of $e$ stored by memory 360. Any signal in 360 is amplified by power amplifier 361 which drives motor 362. (Motor 362 is velocity stabilized by feedback to summing junction 371 to assure that the motor runs at an essentially constant speed.) The motor 362 drives the wiper of potentiometer 364 through gear train 363. Potentiometer 364 controls the gain of the $e'$ vs. $e$ switching function generator 366. Thus, any $e$ having an absolute value greater than zero (and within the band N of the absolute value triggered flip-flop 118) will cause a corresponding change in the position of the wiper of potentiometer 364, thereby changing the gain of the switching function.

The embodiment of the correction circuit shown in FIG. 8 is a completely analog mechanization. In addition to the advantages pointed out hereinbefore, the use of a motor driven potentiometer as a gain changer eliminates the need for a separated storage device to hold the proper switching function gain setting during any period wherein the system is deenergized.

FIG. 9 illustrates in detail, one embodiment of section 9—9 of FIG. 8. The inputs (P) and (Q) and output (R) of FIG. 8 correspond to the inputs (P) and (Q) and output (R) of FIG. 9. When the input line (P) of the circuit of FIG. 9 receives a signal from flip-flop 260 the activation coil of relay 380 is energized. This causes the contacts 386 to close and transmit the amplified value of $e$ to capacitor $C_1$ through $R_1$. Upon the termination of the initiating signal from gate 148 (due to passage of the $e'$ vs. $e$ trajectory out of the E' band), the trigger 252 resets flip-flop 260, thereby terminating the input to coil 380 and opening relay contacts 386. Thereafter, the voltage across capacitor $C_1$ appears at the output (R). The voltage across capacitor $C_1$ decreases primarily by reason of current flowing through resistor $R_3$ and $R_4$ and zener diode 384. The zener diode 384 is employed to make the delay approximately linear.

The simplest type of control mechanism employs one switching curve, and the switching function employed therein is a function of only two variables. In complicated systems, switching is a function of more than two output variables; usually the additional variables are higher order derivatives of the error $e$. An adapter control for such complicated systems should therefore be able to correct at least two switching curve involving at least two sets of variables.

Figure 10:
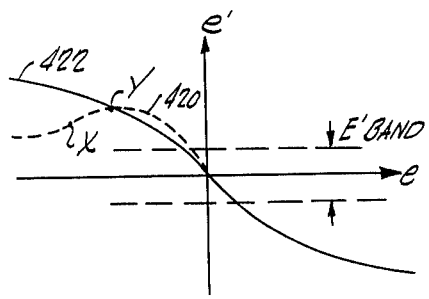
FIG. 10 is a phase diagram plot of the $e'$ vs. $e$ trajectory of a system employing higher order switching and adaption.
Figure 11:
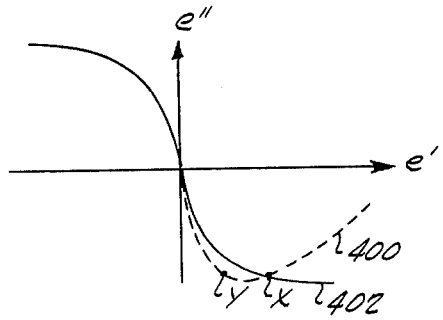
FIG. 11 is a plot of the $e''$ vs. $e'$ trajectory of the same system shown in FIG. 10.

The phase trajectories of a higher order system is illustrated in FIGS. 10 and 11. FIG. 11 shows the phase trajectory of the second derivative of $e$, $e''$ vs. the first derivative $e'$. When the phase trajectory 400 crosses the switching line 402 as at point X, a first reversal in correcting force occurs. As shown in FIG. 10, when the $e'$ vs. $e$ trajectory 420 crosses the $e'$ vs. $e$ switching curve 422, as at point Y, a second force reversal occurs. If a still higher order system were used employing a switching curve in the phase trajectory $e'''$ vs. $e''$, a first force reversal would occur when the $e'''$ vs. $e''$ trajectory crossed the $e''$ switching curve, the next force reversal would occur when the $e''$ vs. $e'$ trajectory 400 crossed the switching curve 402 as at point X, and the next force reversal would occur as described above at point Y.

The correction of the foregoing switching curves may be accomplished by allowing all corrections to occur upon re-entry into the E' band of the $e'$ vs. $e$ trajectory. At that moment, the value of $e'$ may be monitored and the $e''$ vs. $e'$ switching curve varied proportionally to this value of $e'$. At the same time, the value of $e$ (or $E_0$) is monitored and the gain of the $e'$ vs. $e$ switching curve is varied proportionally as described for the circuit of FIG. 7 and the plot of FIG. 6.

Figure 12:
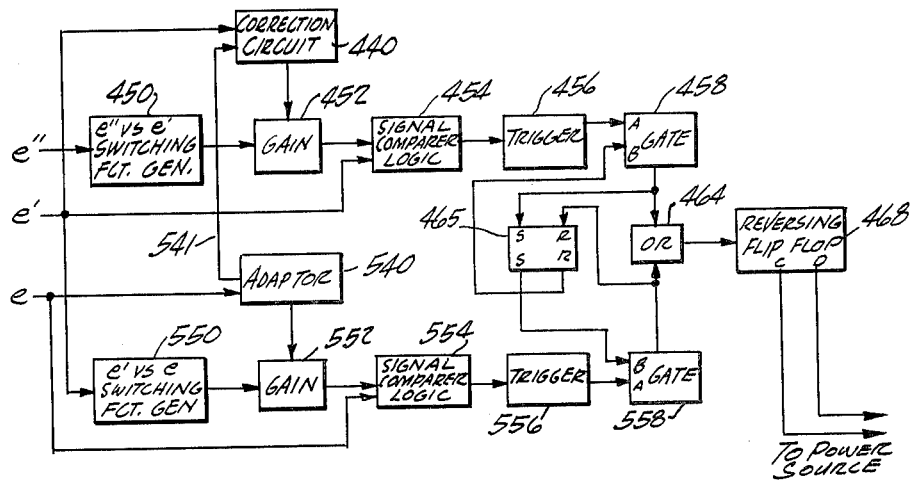
FIG. 12 is a block diagram representation of a control mechanism employing higher order switching and adaption.

A circuit for providing a control mechanism having more than one switching curve and including means for obtaining the more than one switching curve is shown in FIG. 12. The circuit of FIG. 12 includes an $e''$ vs. $e'$ switching function generator 450, whose output is amplified by variable amplifier 452 and delivered to signal comparison logic 454. When the $e''$ vs. $e'$ phase trajectory of the system crosses the switching curve as given by generator 450, the signal comparer logic 454 delivers a signal which causes trigger 456 to generate a trigger pulse. This trigger pulse passes through gate 458, provided that flip-flop 465 is on reset, and thereupon passes through "or" gate 464 and into flip-flop 468. Flip-flop 468 has the characteristic of producing an output pulse on port C upon the receipt of every other input pulse and of producing a pulse on port D at every other input pulse in between. The output ports C and D of flip-flop 468 determine the state of the power to the system (i.e. the polarity or sense of the control force).

The pulse from 458 also sets flip-flop 465. The set output of 465 opens gate 558. When the $e'$ vs. $e$ trajectory crosses the $e'$ vs. $e$ switching curve generated by generator 550, amplified by amplifier 552 and detected by the signal comparer logic of 554, a signal is delivered to trigger 556 which generates a pulse. The pulse travels through gate 558 and "or" gate 464 to reverse the output of flip-flop 468 and again change the polarity of control force.

The trigger pulse from 558 also resets flip-flop 465, thus opening gate 458 and closing gate 558, to return switching control the $e''$ vs. $e'$ switching curve.

The adapter 540 adapts the $e'$ vs. $e$ switching curve by changing the gain of amplifier 552 in the manner described in connection with the entire circuit of FIG. 7. However, in addition to initiating a correction of the $e'$ vs. $e$ switching curve, the adapter 540 is so connected as to initiate a correction of the $e''$ vs. $e'$ adapter 440 by delivering an initiating pulse to correction circuit 440 over line 541. For the adapter 540, a circuit identical to the adapter of FIG. 7 (or as modified by FIG. 8) may be used, providing line 541 is connected to gate 148 in FIG. 7.

Referring to FIG. 7 in connection with its use as the adapter 540 of FIG. 12, when the flip-flop 160 changes to a state of set (upon the re-entry of the $e'$ vs. $e$ phase trajectory within the $e'$ band), a correction initiating pulse is transmitted from gate 148 over line 541 of FIG. 12 to correction circuit 440.

Correction circuit 440 is similar to the correction circuit portion of FIG. 7 which includes trigger 152 and the circuits following: 154, 160, 162, 166 (with an $e'$ input instead of $e$), 168, 170, 172, 174, 175, 176 (with an $e'$ input), 178, 180, 182, 184, 186, 187, 188, 189, 190, 191, 192 (with an $e'$ input), 194, 196 198 and 200. Another embodiment of correction circuit 440 is the circuit of FIG. 8, with $e''$ and $e'$ replacing $e'$ and $e$, respectively. The switching function gain delivered by filter 190 of FIG. 7 or the gear train 313 of FIG. 8 (assuming amplifier 462 is a potentiometer) is connected to and controls the variable gain 452 of FIG. 12.

FIG. 12 illustrates an embodiment employing two switching curves, each a function of two variables. However, higher order systems can be provided by extending the teachings of FIG. 12, as by providing additional correction circuits similar to 440, which may, like block 440, be activated by pulses from line 541. Switching functions of more than two variables each may also be used.

As described hereinbefore the gain of the switching function is often proportional to the value of $E_0$ sampled. However, the change need not be proportional, but may be made in any manner that will alter the switching curve so as to bring it closer to the optimum curve for that system. In some cases, changes in the optimum switching curve are expected to continue and an over correction of the switching curve may be desireable. For example, if the response of a rocket changes because it is using fuel and becoming lighter, such change would be expected to continue and the adapter mechanism might be designed to overcorrect slightly. In other cases, changes in the optimum switching curve are expected to disappear, and an undercorrection of the curve may be desirable.

Although only one E' band is shown, it is possible to employe one band of e' values out of which the phase trajectory must pass in order to prepare the adapter for activation and another band of e' values into which the phase trajectory must pass to initiate the correction cycle. It is also possible to use various bands of e', including an E' band which extends from zero to a negative value, or which includes only one level of e'.

The foregoing description shows that a control mechanism may be made to adapt to changing response characteristics of a controlled system by providing an adapter mechanism which senses at least two output or response variables of the system and provides a correction dependent on the value of one of such variables reaches a certain band of values. Although particular circuits have been shown as embodiments of the invention, the correction of a control mechanism in the manner disclosed may be accomplished by various mechanical means and by other electrical means than shown herein.

Having thus described the invention and the several embodiments thereof, it is desired to emphasize the fact that many further modifications may be resorted to in a manner limited only by a just interpretation of the following claims.

I claim:

1. In control devices for initiating position correcting forces on a controlled system when a predetermined relationship, as given by a function generator, exists between at least two output variable of the controlled system, the improvement comprising:
    first sensor means for sensing the value of a first controlled-system output variable;
    second sensor means for sensing the value of a second controlled-system output variable;
    band actuated signal generating means connected to said second sensor for generating a signal when said second controlled-system ouput variable has a magnitude lying within a predetermined band of values;
    sampling means for sampling the magnitude of said first output variable when said second output variable has a magnitude within said band of values, said sampling means including a first input port for receiving the value of said first variable connected to said first sensor means and a second input port for initiating a sampling connected to said band actuated signal generating means; and
    altering means connected to said sampling means for altering the function given by said function generator according to the value of said first output variable as sampled by said sampling means.

2. The improvement in control devices as defined in claim 1 including:
    anti-sampling means for preventing the altering of said function generator upon the first passage of said output variable into and out of a predetermined band of values.

3. The improvement in control devices as defined in claim 1 wherein said altering means comprises a variable amplifier connected to the output of said function generator, having a gain substantially proportional to the sampled value of said first variable.

4. A control mechanism for turning on and off force producing mechanisms in accordance with the error $e$ and error rate $e'$ of a system comprising:
    a switching curve function generator;
    a variable gain amplifier connected to said function generator;
    error and error rate sensors;
    an error band generator for obtaining a signal indication when the system error $e$ is within predetermined limits;
    an error rate band generator for obtaining a signal indication when the system error rate $e'$ is within predetermined limits;
    a logic device connected to said error band generator and said error rate band generator for obtaining a signal indication upon the occurrence of both an error rate within said predetermined error rate limits and an error within said predetermined error limits;
    correction inhibitor means connected to said error rate band generator, for preventing a correction of the gain of said variable gain amplifier until after said error rate has first acquired a value not within said error rate predetermined limits and then a value within said error rate predetermined limits;
    correction initiating means connected to said logic device and to said correction inhibitor means for initiating a change in said variable gain amplifier;
    evaluating means for measuring the value of said error rate upon activation by said correction initiating means, connected to said correction initiating means and said error sensor; and
    gain changing means connected to said evaluating means and said variable gain amplifier for altering the gain of said amplifier in a manner dependent upon the value of error measured by said evaluating means.

5. A servomechanism as defined in claim 4 wherein said gain changing means includes proportional varying means for varying the gain of said amplifier in approximate proportionality to the value of error measured by said evaluating means.

6. A servomechanism as defined in claim 4 wherein said evaluating means comprises a ramp signal generator triggerable by and connected to said correction initiating means;
    a comparer means for producing a signal indication when said ramp signal exceeds the value of signal generated by said error sensor, connected to said ramp signal generator and said error sensor; and
    a time register connected to and startable by said correction initiating means, and connected to and stoppable by said comparer means.

7. A servomechanism as defined in claim 4 wherein said register is capable of counting in two modes and including:
    a polarity sensor for sensing the polarity of said error and controlling the mode of counting of said register in accordance with the polarity of said error.

References Cited by the Examiner

UNITED STATES PATENTS

| | | | |
|---|---|---|---|
| 2,990,504 | 6/1961 | White | 318—28 |
| 3,141,982 | 7/1964 | Smith | 328—142 |
| 3,182,206 | 5/1965 | Waters | 328—115 |
| 3,184,686 | 5/1965 | Stanton | 308—127 |

ARTHUR GAUSS, *Primary Examiner.*

B. P. DAVIS, *Assistant Examiner.*